(12) United States Patent
Yamamoto et al.

(10) Patent No.: US 12,375,814 B2
(45) Date of Patent: Jul. 29, 2025

(54) INFORMATION PROCESSING DEVICE

(71) Applicant: TOYOTA JIDOSHA KABUSHIKI KAISHA, Toyota (JP)

(72) Inventors: Shusuke Yamamoto, Tokyo (JP); Chikara Okazaki, Gotemba (JP); Kohta Watatsu, Nagoya (JP); Hideyuki Tanaka, Nisshin (JP); Shinya Murase, Nagoya (JP); Yuki Tatsumoto, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 44 days.

(21) Appl. No.: 18/239,434

(22) Filed: Aug. 29, 2023

(65) Prior Publication Data

US 2024/0137652 A1 Apr. 25, 2024
US 2024/0236495 A9 Jul. 11, 2024

(30) Foreign Application Priority Data

Oct. 21, 2022 (JP) .................. 2022-169401

(51) Int. Cl.
*H04N 23/695* (2023.01)
*B60R 1/22* (2022.01)
*B60W 50/14* (2020.01)
*G06V 20/13* (2022.01)

(52) U.S. Cl.
CPC ............. *H04N 23/695* (2023.01); *B60R 1/22* (2022.01); *B60W 50/14* (2013.01); *G06V 20/13* (2022.01); *B60R 2300/607* (2013.01); *B60R 2300/8093* (2013.01); *B60W 2050/146* (2013.01); *G06V 2201/08* (2022.01)

(58) Field of Classification Search
CPC ...... H04N 23/695; H04N 23/60; H04N 23/90; B60R 1/22; B60R 2300/607; B60R 2300/8093; B60R 1/00; B60R 1/27; B60W 50/14; B60W 2050/146; G06V 20/13; G06V 2201/08; G06V 20/52; G08G 1/168
USPC ................................ 348/148; 382/103–104
See application file for complete search history.

(56) References Cited

U.S. PATENT DOCUMENTS

| | | | |
|---|---|---|---|
| 6,084,510 A * | 7/2000 | Lemelson ............. | G08G 1/164 382/104 |
| 6,608,559 B1 * | 8/2003 | Lemelson ............ | G08B 15/004 382/104 |
| 10,392,012 B2 * | 8/2019 | Tannenbaum ........ | B60W 50/14 |
| 12,179,695 B2 * | 12/2024 | Potter .................... | G08B 21/02 |
| 12,203,773 B1 * | 1/2025 | Jau ..................... | G01C 21/3807 |
| 2007/0152804 A1 * | 7/2007 | Breed .............. | G08G 1/096783 701/301 |

(Continued)

FOREIGN PATENT DOCUMENTS

JP 2008-176555 A 7/2008
JP 2011-114361 A 6/2011

(Continued)

*Primary Examiner* — Christopher S Kelley
*Assistant Examiner* — Asmamaw G Tarko
(74) *Attorney, Agent, or Firm* — Oliff PLC (57) ABSTRACT

An information processing device includes an acquisition section that acquires a satellite image of a ground area captured by an artificial satellite, and a control section that controls onboard equipment installed at a vehicle appearing in the satellite image based on an analysis result of the satellite image that the acquisition section has acquired.

2 Claims, 6 Drawing Sheets (56) References Cited

U.S. PATENT DOCUMENTS

| | | | | |
|---|---|---|---|---|
| 2013/0021453 | A1* | 1/2013 | Gignac | H04N 13/302 |
| | | | | 348/E13.001 |
| 2016/0093212 | A1* | 3/2016 | Barfield, Jr. | G08G 1/0133 |
| | | | | 348/144 |
| 2019/0354771 | A1* | 11/2019 | Kleinrock | G06F 16/909 |
| 2020/0023797 | A1* | 1/2020 | Volos | B60R 21/013 |
| 2020/0148112 | A1 | 5/2020 | Itoh et al. | |
| 2022/0139213 | A1 | 5/2022 | Flade et al. | |
| 2022/0242593 | A1* | 8/2022 | Ezawa | B64G 1/66 |
| 2024/0029391 | A1* | 1/2024 | Satoh | H04N 7/18 |
| 2024/0056556 | A1* | 2/2024 | Aoki | G06T 1/00 |

FOREIGN PATENT DOCUMENTS

| | | |
|---|---|---|
| JP | 2017-67466 A | 4/2017 |
| JP | 2020-80485 A | 5/2020 |
| JP | 2022-74068 A | 5/2022 |
| WO | 2017/141375 A1 | 8/2017 |

* cited by examiner

INFORMATION PROCESSING DEVICE

CROSS-REFERENCE TO RELATED APPLICATION

This application claims priority under 35 USC 119 from Japanese Patent Application No. 2022-169401, filed on Oct. 21, 2022, the disclosure of which is incorporated by reference herein.

BACKGROUND

Technical Field

The present disclosure relates to an information processing device.

Related Art

Japanese Patent Application Laid-Open (JP-A) No. 2011-114361, discloses a vehicle periphery confirmation system capable of alleviating a sense of incongruity given to a user and providing a vehicle periphery image that does not invite misunderstanding to the user, by eliminating a distorted shape of an image of an own-vehicle periphery displayed on a display.

Conventionally, an image has been displayed on the display of JP-A No. 2011-114361, based on control by control equipment of a vehicle, but there is still room for improvement regarding a control method of onboard equipment such as the display.

SUMMARY

The present disclosure provides an information processing device capable of controlling onboard equipment installed at a vehicle at a timing determined by viewing a vehicle periphery from a bird's-eye view.

An information processing device according to a first aspect of the present disclosure includes: an acquisition section that acquires a satellite image of a ground area captured by an artificial satellite; and a control section that controls onboard equipment installed at a vehicle appearing in the satellite image based on an analysis result of the satellite image that the acquisition section has acquired.

In the information processing device according to the first aspect of the present disclosure, the acquisition section acquires the satellite image. The control section then controls the onboard equipment installed at the vehicle appearing in the satellite image based on the analysis result of the satellite image that the acquisition section has acquired. Consequently, in the information processing device, the onboard equipment installed at the vehicle can be controlled at a timing determined by viewing a vehicle periphery from a bird's-eye view.

In a second aspect of the present disclosure, in the first aspect, in a case in which a danger to the vehicle has been detected from the analysis result of the satellite image, the control section may cause imaging by a camera serving as the onboard equipment to be started.

In the information processing device according to the second aspect of the present disclosure, in a case in which a danger to the vehicle has been detected from the analysis result of the satellite image, the control section causes imaging by the camera to be started. Consequently, in the information processing device, imaging by the camera may be started at a timing when the danger to the vehicle has been detected by viewing the vehicle periphery from a bird's-eye view.

In a third aspect of the present disclosure, in the second aspect, the control section may control an angle of view of the camera so that a position at which the danger to the vehicle has been detected is included in a imaging range.

In the information processing device according to the third aspect of the present disclosure, the control section controls the angle of view of the camera so that the position at which the danger to the vehicle has been detected is included in the imaging range. Consequently, in the information processing device, the probability that a target that triggered the detection of the danger to the vehicle will be captured may be increased.

A fourth aspect of the present disclosure, in any one of the first to third aspects, may further include a provision section that provides at least one of the satellite image or a current position of the vehicle to a predetermined user in a case in which a danger to the vehicle has been detected from the analysis result of the satellite image.

In the information processing device according to the fourth aspect of the present disclosure, in a case in which a danger to the vehicle has been detected from the analysis result of the satellite image, the provision section provides at least one of the satellite image or the current position of the vehicle to the predetermined user. Consequently, in the information processing device, in a case in which a defect with respect to the vehicle has arisen based on the detected danger, a contribution to solving the defect may be made.

In a fifth aspect of the present disclosure, in any one of the first to fourth aspects, in a case in which the vehicle is in the course of parking in a parking lot, the control section may cause a bird's-eye view image of the vehicle appearing in the satellite image to be displayed on a monitor serving as the onboard equipment.

In the information processing device according to the fifth aspect of the present disclosure, in a case in which the vehicle is in the course of parking in a parking lot, the control section causes the bird's-eye view image of the vehicle appearing in the satellite image to be displayed on the monitor. Consequently, in the information processing device, parking may be carried out while viewing an actual image of the vehicle, and a sense of incongruity felt by an occupant with respect to the content displayed on the monitor as parking assistance may be reduced.

According to the aforementioned aspects, the information processing device according to the present disclosure may control the onboard equipment installed at the vehicle at a timing determined by viewing the vehicle periphery from a bird's-eye view.

BRIEF DESCRIPTION OF THE DRAWINGS

Exemplary embodiments will be described in detail based on the following figures, wherein.

DETAILED DESCRIPTION

A control system 100 according to the present exemplary embodiments will be explained below. The control system 100 according to the present exemplary embodiments is a system that controls onboard equipment installed at a vehicle at a timing determined by viewing a vehicle periphery from a bird's-eye view.

First Exemplary Embodiment

First, a first exemplary embodiment of the control system 100 according to the present exemplary embodiments will be explained.

Figure 1:
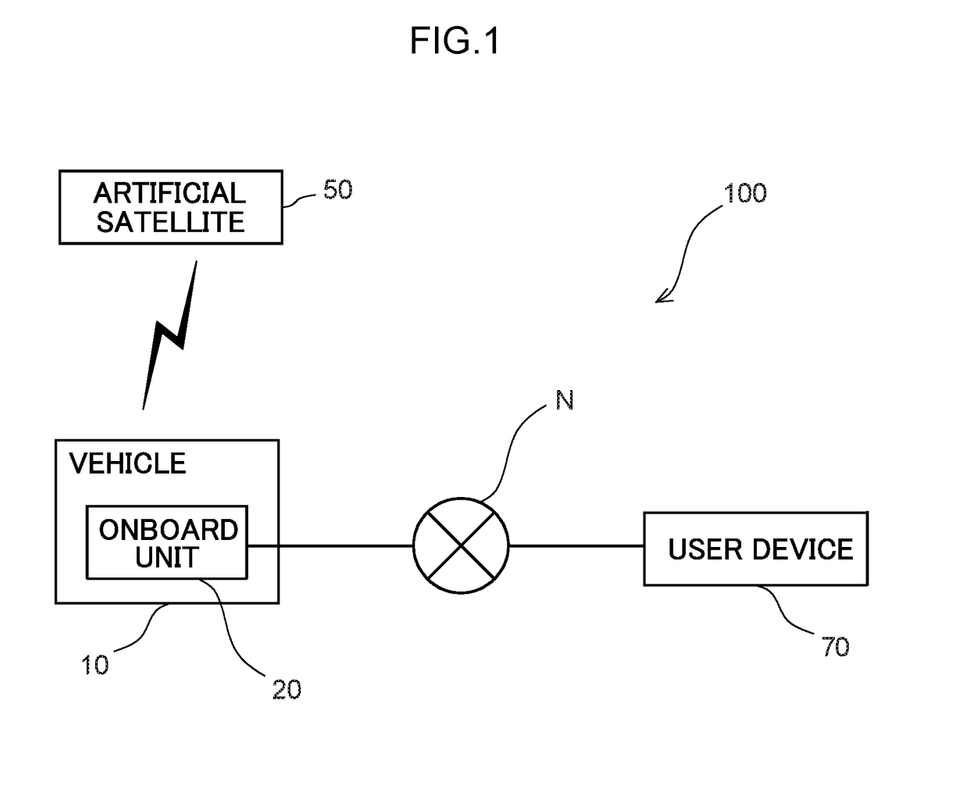
FIG. 1 is a diagram illustrating a schematic configuration of a control system.

FIG. 1 is a diagram illustrating a schematic configuration of the control system 100. As illustrated in FIG. 1, the control system 100 includes a vehicle 10, an artificial satellite 50, and a user device 70.

Although the vehicle 10 may be an engine vehicle, a hybrid vehicle, or an electric vehicle, in the first exemplary embodiment, as an example, the vehicle 10 is configured as an engine vehicle. Further, an onboard unit 20 installed at the vehicle 10 acquires an image (hereafter also referred to as a "satellite image") captured by an artificial satellite 50, from the artificial satellite 50. It should be noted that the satellite image may be configured as, for example, an image in which a range of from 0.5 km to 20 km square on the ground area is set as an imaging target. This ground area includes land, lakes, ponds, the sea, and the like. The onboard unit 20 is an example of an "information processing device".

The user device 70 is a computer held by a predetermined user. Users include police, insurance companies, security companies, and the like. Further, the onboard unit 20 and the user device 70 are connected via a network N.

Although only one artificial satellite 50 is illustrated in FIG. 1, the artificial satellite 50 is preferably configured by plural artificial satellites capable of imaging the same point on the ground area. Further, a number of times that the artificial satellite 50 orbits the earth in one day, an altitude of an orbit of the artificial satellite 50, and the like are arbitrary.

Figure 2:
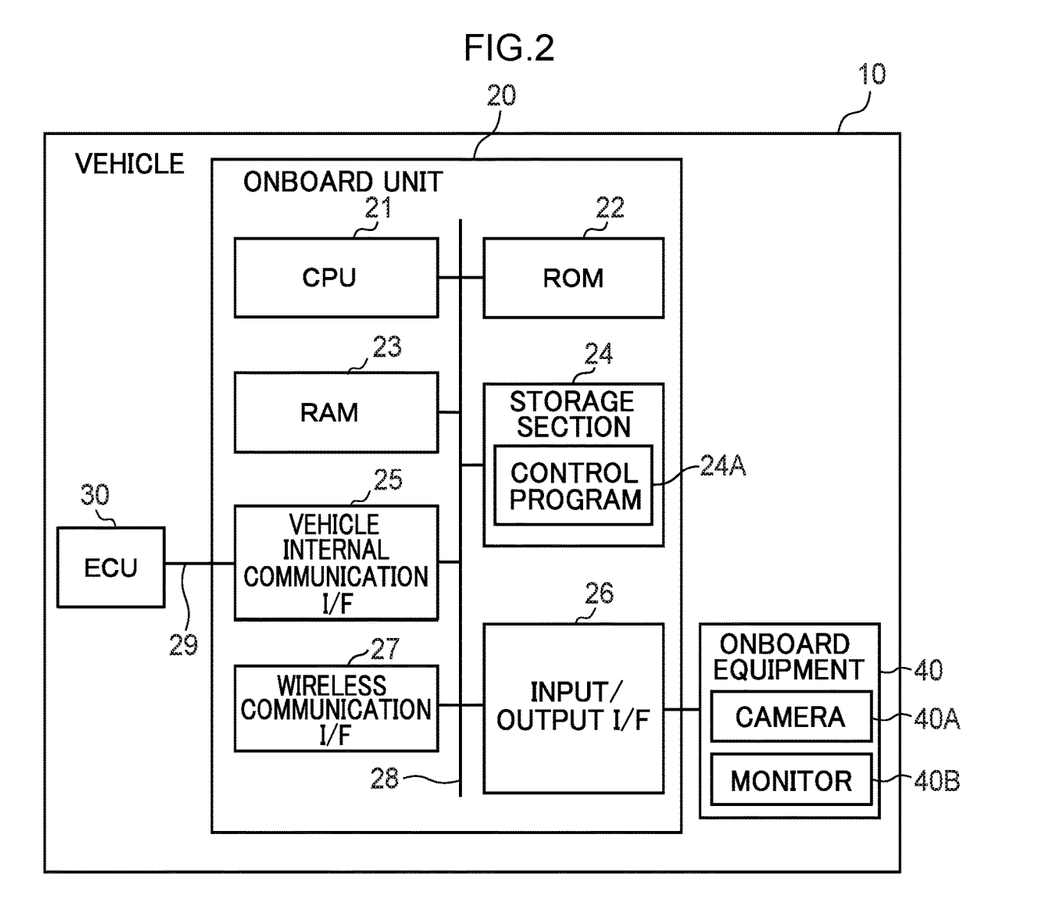
FIG. 2 is a block diagram illustrating a hardware configuration of a vehicle.

Next, a hardware configuration of the vehicle 10 will be explained. FIG. 2 is a block diagram illustrating the hardware configuration of the vehicle 10.

As illustrated in FIG. 2, the vehicle 10 is configured to include the onboard unit 20, an electronic control unit (ECU) 30, and onboard equipment 40.

The onboard unit 20 is configured to include a central processing unit (CPU) 21, a read only memory (ROM) 22, a random access memory (RAM) 23, a storage section 24, a vehicle internal communication interface (I/F) 25, an input/output I/F 26, and a wireless communication I/F 27. The CPU 21, the ROM 22, the RAM 23, the storage section 24, the vehicle internal communication I/F 25, the input/output I/F 26, and the wireless communication I/F 27 are connected so as to be capable of communicating with each other via an internal bus 28.

The CPU 21 is a central processing unit, and the CPU 21 executes various programs and controls various sections. Namely, the CPU 21 reads a program from the ROM 22 or the storage section 24, and executes the program using the RAM 23 as a workspace. The CPU 21 carries out control of the aforementioned respective configurations and various kinds of processing according to programs stored in the ROM 22 or the storage section 24.

The ROM 22 stores various programs and various data. The RAM 23 serves as a workspace to temporarily store programs and data.

The storage section 24 is configured by a storage device such as an embedded multi media card (eMMC), a universal flash storage (UFS), or the like, and stores various programs and various data. A control program 24A for causing the CPU 21 to execute control processing, which will be described later, is stored in the storage section 24.

The vehicle internal communication I/F 25 is an interface for connecting with the ECU 30. A communication standard based on the CAN protocol is used for the interface. The vehicle internal communication I/F 25 is connected to an external bus 29. It should be noted that, although not illustrated in the drawings, plural ECUs 30 are respectively provided for each function of the vehicle 10.

The input/output I/F 26 is an interface for communicating with the onboard equipment 40 installed at the vehicle 10.

The onboard equipment 40 is various equipment installed at the vehicle 10. The control system 100 according to the first exemplary embodiment includes a camera 40A and a monitor 40B as examples of the onboard equipment 40.

As an example, the camera 40A is a imaging device that carries out imaging using a imaging element such as a charge coupled device (CCD) image sensor, a complementary metal oxide semiconductor (CMOS) image sensor, or the like. As an example, the camera 40A includes a first camera provided at a front portion of the vehicle 10 and images a vehicle front, and a second camera provided at a rear portion of the vehicle 10 and images a vehicle rear. In the control system 100 according to the first exemplary embodiment, the camera 40A is used in an application for a vehicle traveling data recorder, and an image captured by the camera 40A is stored in the storage section 24. It should be noted that the number of the cameras 40A is not limited, and that separate cameras that photograph sides of the vehicle may be provided, or only a camera that images any one direction of a vehicle front, a vehicle rear, or a vehicle side may be provided.

The monitor 40B is provided at an instrument panel, a meter panel, or the like, and is a liquid crystal monitor for displaying suggestions for operation relating to functionality of the vehicle 10, images relating to explanation of the functionality, and the like. The monitor 40B may be provided as a touch panel that also serves an input function.

The wireless communication I/F 27 is a wireless communication module for communicating with an exterior. For example, a communication standard such as 5G, LTE, Wi-Fi (registered trademark) or the like is used for the wireless communication module. The wireless communication I/F 27 is connected to the network N.

Figure 3:
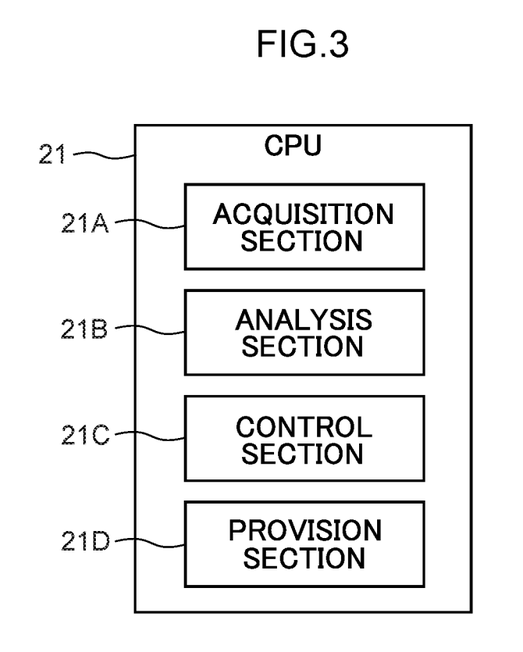
FIG. 3 is a block diagram illustrating an example of a functional configuration of the vehicle.

Next, a functional configuration of the vehicle 10 will be explained. FIG. 3 is a block diagram illustrating an example of the functional configuration of the vehicle 10.

As illustrated in FIG. 3, the CPU 21 of the onboard unit 20 includes an acquisition section 21A, an analysis section 21B, a control section 21C, and a provision section 21D as functional configuration. The respective functional configuration is implemented by the CPU 21 reading and executing the control program 24A stored in the storage section 24.

The acquisition section 21A acquires an image of a vehicle 10 periphery captured from a bird's-eye view, specifically a satellite image of the vehicle 10 periphery on the ground area captured by the artificial satellite 50.

The analysis section 21B analyzes the satellite image acquired by the acquisition section 21A. As an example, the analysis section 21B uses known image recognition technology to analyze whether or not there is a danger to the vehicle 10 from the captured satellite image of the vehicle 10 periphery. More specifically, in a case in which the analysis section 21B has detected a predetermined dangerous situation from the satellite image, the analysis section 21B detects that there is a danger to the vehicle 10. It should be noted that the predetermined dangerous situation is stored in the storage section 24 and can be updated as appropriate. Further, dangers to the vehicle 10 include both incidents and accidents. For example, such incidents correspond to the presence of a suspicious individual or a dangerous substance, an attempted vehicle break-in, or the like, and such accidents correspond to the occurrence of a hit-and-run, a vehicle break-in, or the like.

The control section 21C controls the camera 40A serving as the onboard equipment 40 installed at the vehicle 10 appearing in the satellite image, based on an analysis result of the satellite image by the analysis section 21B. More specifically, in a case in which the control section 21C has detected from the analysis result of the satellite image that there is a danger to the vehicle 10, the control section 21C causes imaging by the camera 40A to be started. Further, in this case, the control section 21C controls an angle of view of the camera 40A so that a position at which the danger to the vehicle 10 has been detected is included in a imaging range.

In a case in which it has been detected from the analysis result of the satellite image by the analysis section 21B that there is a danger to the vehicle 10, the provision section 21D transmits the satellite image and a current position of the vehicle 10 to the user device 70. It should be noted that the current position of the vehicle 10 can be acquired from a global positioning system (GPS) device (not illustrated in the drawings) serving as the onboard equipment 40.

Figure 4:
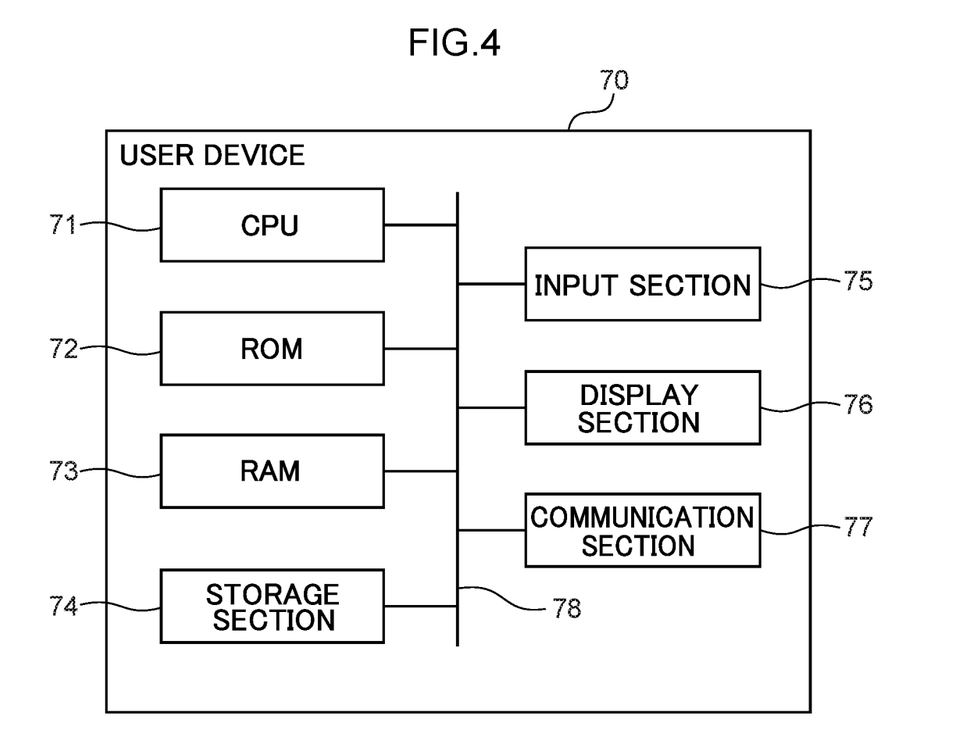
FIG. 4 is a block diagram illustrating a hardware configuration of a user device.

Next, a hardware configuration of the user device 70 will be explained. FIG. 4 is a block diagram illustrating the hardware configuration of the user device 70. For the user device 70, a general-purpose computer device such as a server computer, a personal computer (PC) or the like, or a portable terminal such as a smart phone, a tablet terminal or the like, can be applied. In the first exemplary embodiment, the user device 70 is configured as a "PC".

As illustrated in FIG. 4, the user device 70 includes a CPU 71, a ROM 72, a RAM 73, a storage section 74, an input section 75, a display section 76, and a communication section 77. These respective configurations are connected via a bus 78 so as to be capable of communicating with each other.

The CPU 71 is a central processing unit, and the CPU 71 executes various programs and controls various sections. Namely, the CPU 71 reads a program from the ROM 72 or the storage section 74, and executes the program using the RAM 73 as a workspace. The CPU 71 carries out control of the aforementioned respective configurations and various kinds of processing according to programs stored in the ROM 72 or the storage section 74.

The ROM 72 stores various programs and various data. The RAM 73 serves as a workspace to temporarily store programs and data.

The storage section 74 is configured by a storage device such as a hard disk drive (HDD), a solid state drive (SSD), a flash memory or the like, and stores various programs and various data.

The input section 75 includes a pointing device such as a mouse or the like, a keyboard, a microphone, a camera, and the like, and is used to carry out various kinds of input.

The display section 76 is, for example, a liquid crystal display, and displays various information. The display section 76 may employ a touch panel system to function as the input section 75.

The communication section 77 is an interface for communicating with other devices. For example, a wired communication standard such as Ethernet (registered trademark), FDDI or the like, or a wireless communication standard such as 4G, 5G, Bluetooth (registered trademark), Wi-Fi (registered trademark) or the like, is used for this communication. The communication section 77 is connected to the network N.

Figure 5:
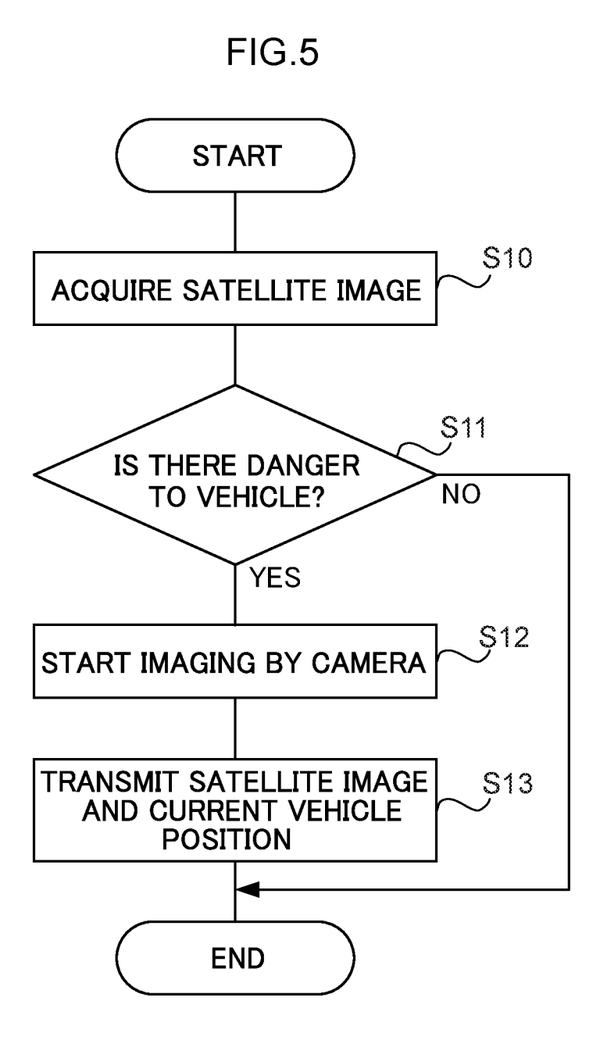
FIG. 5 is a first flowchart illustrating a flow of control processing.

FIG. 5 is a first flowchart illustrating a flow of control processing performed by the onboard unit 20 to control the onboard equipment 40. The control processing is performed by the CPU 21 reading the control program 24A from the storage section 24, and expanding and executing the control program 24A in the RAM 23.

At step S10 illustrated in FIG. 5, the CPU 21 acquires a captured satellite image of the vehicle 10 periphery from the artificial satellite 50. Then, the CPU 21 proceeds to step S11. As an example, the CPU 21 periodically acquires satellite images from the artificial satellite 50.

At step S11, the CPU 21 analyzes, from the satellite image acquired at step S10, whether or not there is a danger to the vehicle 10, and in a case in which it has been detected that there is a danger to the vehicle 10 (step S11: YES), the CPU 21 proceeds to step S12. On the other hand, in a case in which it has been detected that there is no danger to the vehicle 10 (step S11: NO), the CPU 21 ends the control processing.

At step S12, the CPU 21 controls the angle of view of the camera 40A so that the position at which the danger to the vehicle 10 has been detected is included in the imaging range, and causes imaging by the camera 40A to be started. Then, the CPU 21 proceeds to step S13.

At step S13, the CPU 21 transmits the satellite image acquired at step S10 and the current position of the vehicle 10 to the user device 70. Then, the CPU 21 ends the control processing.

As described above, in the onboard unit 20 according to the first exemplary embodiment, the CPU 21 acquires a satellite image. Then, the CPU 21 controls the onboard equipment 40 installed at the vehicle 10 appearing in the satellite image, based on the analysis result of the acquired satellite image. Consequently, in the onboard unit 20, the onboard equipment 40 installed at the vehicle 10 can be controlled at a timing determined by viewing the vehicle 10 periphery from a bird's-eye view.

Further, in the onboard unit 20 according to the first exemplary embodiment, in a case in which a danger to the vehicle 10 has been detected from the analysis result of the satellite image, the CPU 21 causes imaging by the camera 40A to be started. Consequently, in the onboard unit 20, imaging by the camera 40A can be started at a timing when the danger to the vehicle 10 has been detected by viewing the vehicle 10 periphery from a bird's-eye view.

Furthermore, in the onboard unit 20 according to the first exemplary embodiment, the CPU 21 controls the angle of view of the camera 40A so that the position at which the danger to the vehicle 10 has been detected is included in the imaging range. Consequently, in the onboard unit 20, the probability that a target that triggered the detection of the danger to the vehicle 10 will be captured can be increased.

Moreover, in the onboard unit 20 according to the first exemplary embodiment, in a case in which a danger to the vehicle 10 has been detected from the analysis result of the satellite image, the CPU 21 provides the satellite image and the current position of the vehicle 10 to a predetermined user. Consequently, in the onboard unit 20, in a case in which a defect with respect to the vehicle 10 has arisen based on the detected danger, a contribution to solving the defect can be made. More specifically, the CPU 21 can transmit the satellite image and the current position of the vehicle 10 to the user device 70 held by the user, and occurrence of an accident or an incident may be prevented in advance, or on-site materials at the time when an accident or an incident has occurred may be provided.

Second Exemplary Embodiment

Next, a second exemplary embodiment of the control system 100 according to the present exemplary embodiments will be explained, while omitting or simplifying portions that overlap with the above exemplary embodiment.

The control section 21C of the second exemplary embodiment controls the monitor 40B serving as the onboard equipment 40 installed at the vehicle 10 appearing in the satellite image, based on the analysis result of the satellite image by the analysis section 21B. More specifically, in a case in which the vehicle 10 is in the course of parking in a parking lot, the control section 21C causes a bird's-eye view image of the vehicle 10 appearing in the satellite image to be displayed on the monitor 40B. As an example, based on a shift position of a shift lever (not illustrated in the drawings) serving as the onboard equipment 40, the current position of the vehicle 10, and the like, the control section 21C determines whether or not the vehicle 10 is in the course of parking in a parking lot.

Figure 6:
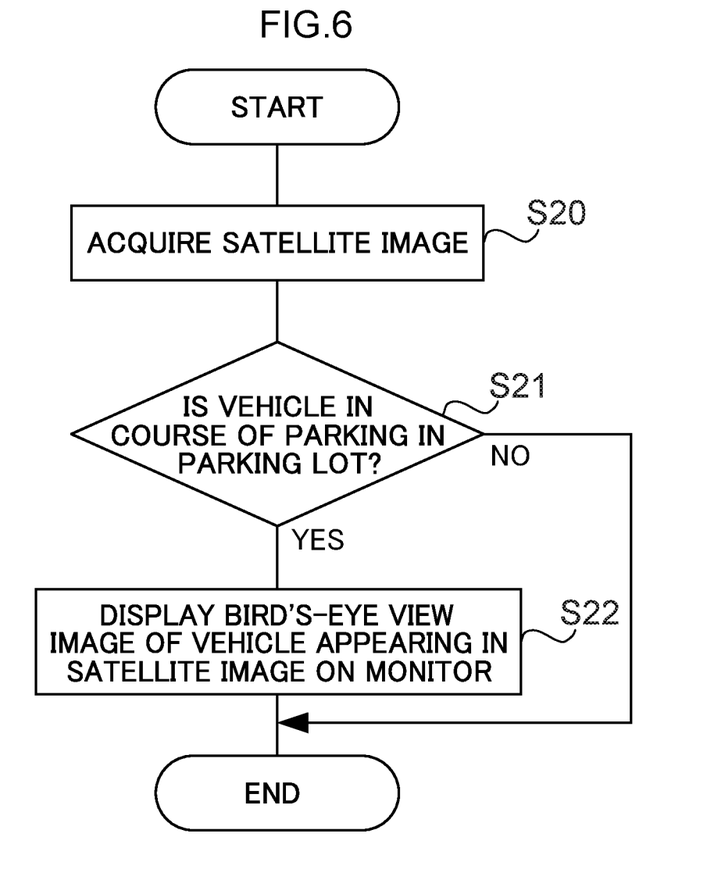
FIG. 6 is a second flowchart illustrating a flow of control processing.

FIG. 6 is a second flowchart illustrating a flow of control processing. At step S20 illustrated in FIG. 6, the CPU 21 acquires a captured satellite image of the vehicle 10 periphery from the artificial satellite 50. Then, the CPU 21 proceeds to step S21.

At step S21, the CPU 21 determines whether or not the vehicle 10 is in the course of parking in a parking lot, and, in a case in which it has been determined that the vehicle 10 is in the course of parking in a parking lot (step S21: YES), the CPU 21 proceeds to step S22. On the other hand, in a case in which it has been determined that the vehicle 10 is not in the course of parking in a parking lot (step S21: NO), the CPU 21 ends the control processing.

At step S22, the CPU 21 causes a bird's-eye view image of the vehicle 10 appearing in the satellite image acquired at step S20 to be displayed on the monitor 40B. Then, the CPU 21 ends the control processing.

As described above, in the onboard unit 20 according to the second exemplary embodiment, in a case in which the vehicle 10 is in the course of parking in a parking lot, the CPU 21 causes the bird's-eye view image of the vehicle 10 appearing in the satellite image to be displayed on the monitor 40B. Consequently, in the onboard unit 20, parking can be carried out while viewing an actual image of the vehicle 10, and a sense of incongruity felt by an occupant with respect to the content displayed on the monitor 40B as parking assistance can be reduced.

[Other Matters]

Although the onboard unit 20 is an example of the information processing device in the exemplary embodiments described above, there is no limitation thereto, and another device (e.g., a server) that is capable of acquiring the satellite image from the artificial satellite 50 may be an example of the information processing device, or a combination of the onboard unit 20 and another device may be an example of the information processing device. For example, in a case in which another device is an example of the information processing device, in the control system 100, peripheries of plural vehicles 10 can be monitored based on the satellite image, and the onboard equipment 40 installed at the corresponding vehicle 10 can be controlled at a timing determined by viewing the peripheries of the respective vehicles 10 from a bird's-eye view. Further, in a case in which another device is an example of the information processing device, the other device determines whether or not the vehicle 10 is in the course of parking in a parking lot from the analysis result of the satellite image. Furthermore, in the control system 100, based on the determination by the other device that the vehicle 10 is in the course of parking in a parking lot, the bird's-eye view image of the vehicle 10 appearing in the satellite image is displayed on the monitor 40B.

Although, in the exemplary embodiments described above, an example of the onboard equipment 40 that is controlled at a timing determined by viewing the vehicle 10 periphery from a bird's-eye view is the camera 40A or the monitor 40B, examples of the onboard equipment 40 are not limited thereto. For example, in a case in which it has been detected that there is a danger to the vehicle 10 from the analysis result of the satellite image, a predetermined warning sound may be output from a speaker (not illustrated in the drawings) serving as the onboard equipment 40, or a lamp (not illustrated in the drawings) serving as the onboard equipment 40 may be illuminated in a predetermined pattern.

In the exemplary embodiments described above, in a case in which it has been detected from the analysis result of the satellite image that there is a danger to the vehicle 10, the CPU 21 provides the satellite image and the current position of the vehicle 10 to the predetermined user. However, there is no limitation thereto, and either one of the satellite image or the current position of the vehicle 10 may be provided to the predetermined user.

It should be noted that various types of processors other than a CPU may execute the control processing executed by the CPU 21 reading and executing software (a program) in the exemplary embodiments described above. Such processors include programmable logic devices (PLD) that allow circuit configuration to be modified post-manufacture, such as a field-programmable gate array (FPGA) or the like, and dedicated electric circuits, which are processors including a circuit configuration that has been custom-designed to execute specific processing, such as an application specific integrated circuit (ASIC) or the like. Further, the control processing may be executed by any one of these various types of processors, or by a combination of two or more of the same type or different types of processors (such as, for example, plural FPGAs, a combination of a CPU and an FPGA, or the like). Furthermore, the hardware structure of these various types of processors is, more specifically, an electric circuit combining circuit elements such as semiconductor elements or the like.

Further, in the exemplary embodiments described above, although explanation has been given regarding an aspect in which the control program 24A is stored (installed) in advance in the storage section 24, there is no limitation thereto. The control program 24A may be provided in a format stored on a recording medium such as a compact disc read only memory (CD-ROM), a digital versatile disc read only memory (DVD-ROM), a universal serial bus (USB) memory or the like. Further, the control program 24A may be in a format that is downloaded from an external device via the network N.

What is claimed is:

1. An information processing device comprising:
a memory; and
a processor coupled to the memory, the processor being configured to:
acquire a satellite image of a ground area that is captured by an artificial satellite; and
control a camera installed on a vehicle appearing in the satellite image based on an analysis result of the satellite image,
wherein the processor is further configured to:
in a case in which a danger to the vehicle has been detected from the analysis result of the satellite image, start imaging by the camera installed on the vehicle, the danger to the vehicle being a presence of a suspicious individual or a dangerous substance, or occurrence of a hit-and-run or a break-in of the vehicle,
control an angle of view of the camera so that a position at which the danger to the vehicle has been detected is included in an imaging range of the camera,
output a predetermined warning sound from a speaker installed on the vehicle, and
provide the satellite image and a current position of the vehicle to a predetermined user.

2. The information processing device according to claim 1, wherein, in a case in which the vehicle is in the course of parking in a parking lot, the processor is configured to cause a bird's-eye view image of the vehicle appearing in the satellite image to be displayed on a monitor installed on the vehicle.

* * * * *